July 23, 1940.    O. M. DUNNING    2,208,940
OSCILLATION TRANSLATING SYSTEM
Filed April 2, 1937
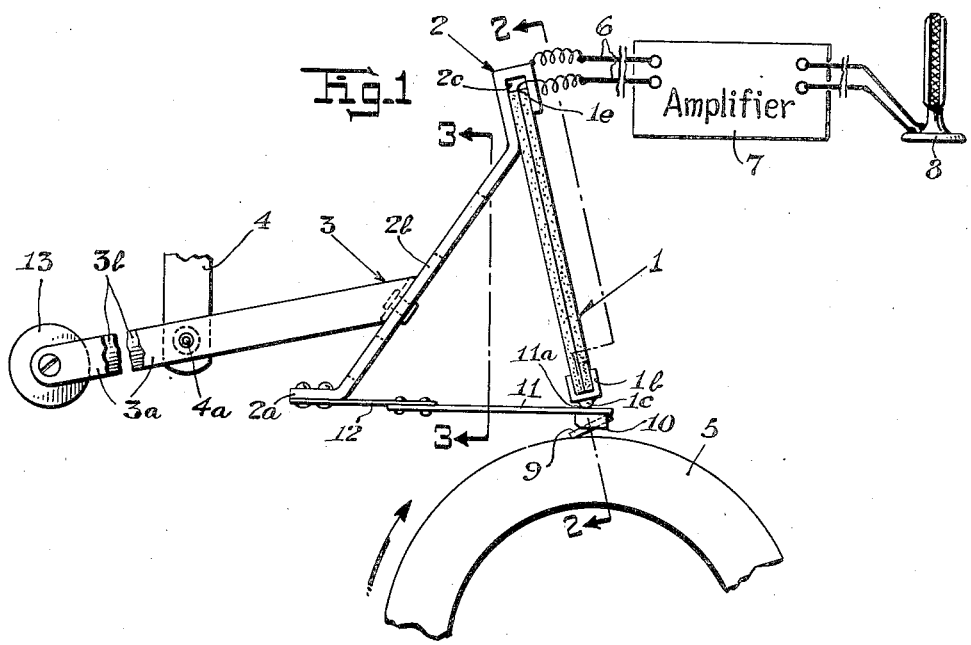
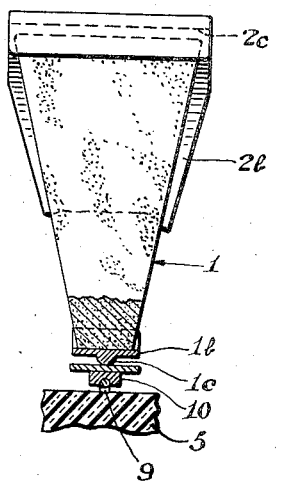
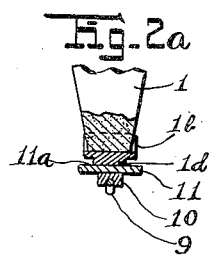
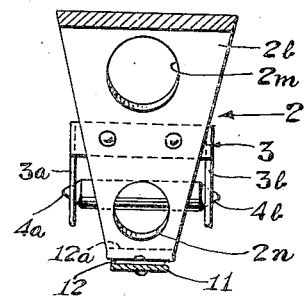
INVENTOR
Orville M. Dunning
BY Henry Lanahan
ATTORNEY Patented July 23, 1940

2,208,940

UNITED STATES PATENT OFFICE 2,208,940

OSCILLATION TRANSLATING SYSTEM

Orville M. Dunning, Glen Ridge, N. J., assignor to Thomas A. Edison, Incorporated, West Orange, N. J., a corporation of New Jersey Application April 2, 1937, Serial No. 134,669

12 Claims. (Cl. 179—100.41)

This invention relates to oscillation translating systems, and more particularly to systems for translating acoustic or electric oscillations into mechanical oscillations, or vibrations, of a load.

It is a broad object of my invention to provide an improved, and improvements for a, translating system of the class described.

It is another object mutually to relate in improved manner the translating device proper and the load in such a system.

While not in all aspects limited thereto, the invention has particular utility with recording systems, actuated by sound or sound-representing electric oscillations, and having a mechanical load in the form of a device co-acting with a moving record—as for the cutting, engraving, impressing, or other forming of sound representations in or on the record.

It is a broad object to provide an improved, and improvements for a, sound recording system.

In connection with such recording systems it has been found that the "surface noise" with which a recorded record will be later reproduced is not alone a function of the conditions obtaining during reproduction and of the nature of the record per se, but is also a function of phenomenon occurring during the initial recordation—these phenomena causing the recording, along with intended representations of sound, of noise representations.

It is an object of my invention to reduce the recordation of these noise representations.

It is an allied object to suppress or minimize the phenomena giving rise to such noise recordation.

It is a further allied object to provide an improved, and improvements for a, recording system whereby such suppression or minimization will be effected.

It appears that one of the phenomena giving rise in typical systems to this noise recordation is a spurious vibration of the record-coacting device, at certain frequencies or over certain continuous frequency spectra, occasioned for example by slight non-homogeneities, hardness variations, surface level variations, or the like in the record with which it co-acts.

It is an object of my invention to suppress or minimize such vibration of the record-coacting device under the influence of the record.

It is an allied object to provide an improved, and improvements for a, recording system whereby such spurious vibration suppression or minimization will be effected.

It appears that another of the phenomena abovementioned is an effective increase or augmentation of the susceptibility of the record-coacting device to this spurious vibration, resulting from the coupling of this device to the primary element which vibrates it—e. g., to the output element of the acoustic-mechanical or electro-mechanical translating device; this element, for efficiency of translating action, frequently of necessity has such reactive and other parameters as to effect this augmentation in very appreciable degree.

It is an object of my invention to reduce or eliminate this augmentation of susceptibility of the record-coacting device to spurious vibration.

It is an allied object to provide an improved, and improvements for a, recording system whereby such reduction or elimination will be effected.

It is another object to increase, within useful limits, the independence of the primary element abovementioned and the record-coacting device.

Another aspect of my invention concerns the fragility of electro-mechanical translating devices of certain types—notably of the piezo-electric type—in recording systems.

It is an object of my invention to provide an improved, and improvements for a, recording system whereby the effect of such fragility will be reduced.

Other and allied objects will more fully appear from the following description and the appended claims.

In the description hereinafter set forth reference is had to the accompanying drawing, of which:

Figure 1 is an elevational view of a purely typical recording system wherein my invention has been incorporated, certain components of the figure, however, being simply schematically shown;

Figure 2 is a cross-sectional view taken along the line 2—2 of Figure 1;

Figure 2a is a fractional cross-sectional view intended for optional substitution for the analogous portion of Figure 2, and illustrating a slight modification thereof; and Figure 3 is a cross-sectional view taken along the line 3—3 of Figure 1.

In the embodiment of my invention which is specifically illustrated and described the oscillation translating system translates acoustic oscillations into mechanical oscillations; more specifically, it translates the acoustic into electric oscillations, and the latter in turn into the mechanical oscillations or vibrations. The translating system illustrated and described is a sound recording system, and the record-coacting device is a stylus arranged for example to cut the moving record, which, purely typically, may be taken as of wax. The arrangement particularly illustrated of the stylus with respect to the record is for the creation in the latter of grooves undulating vertically. The illustrated electro-mechanical translating device proper is of the piezo-electric type, and more specifically is a bending unit of the so-called "bi-morph" form—wherein two crystals are secured face-to-face, electrically arranged for simultaneous voltage application, and further arranged so that one contracts longitudinally as the other expands (and vice versa) to result in a transverse bending. The output element of the translating device, which actuates the record-coacting device (i. e., the "primary elements" abovementioned) is in this particular case the piezo-electric unit itself. It is to be understood, however, that the choice of these particular actions and components, and of those others which will hereinafter appear, is intended as exemplary only, and in no unnecessary way as limitative of the broader aspects of my invention.

Reference being had to Figure 1, and in aid thereof to Figures 2 and 3, there will be seen the translating device or bending unit 1 of the type and form just described; in areal configuration this has been shown as trapezoidal, but no limitation to this particular configuration is intended. The unit 1 is shown secured, as by cementing of its base or longer-dimension extremity, in a channel 2c formed as by suitable folding of the extremity of a frame 2; the frame may extend, in its main portion 2b, away from this extremity to form some acute angle with the unit 1, and to terminate at its opposite extremity in a partially folded-over heel 2a. At an intermediate region on the outer face of the main frame portion 2b may be secured the bracket 3 having the two mutually spaced spring arms 3a and 3b extending away from the frame to be pivoted to suitable rigid pivots, such as 4a and 4b in rigid member 4. The pivoting will be understood as for the purpose of permitting movement of the unit 1, with which the record-coacting device is associated in manner hereinafter described, toward and away from the record 5—which by way of example has been fractionally illustrated as a cylindrical one, and will be understood to be supported for rotation by means not herein necessary to show.

One electrical terminal of the unit 1 may for example be inherently or otherwise connected with the frame 2, which is of course metallic; the other such terminal has been shown as 1e. The conductors 6, respectively connected to the frame 2 and to the terminal 1e, may apply across the unit 1 the oscillatory electrical output of an amplifier 7, to the input of which has been shown connected the microphone 8—the microphone, amplifier and unit 1, taken together, of course forming an acoustic-mechanical oscillation translating system wherein the unit 1 will vibrate transversely in accordance with sound waves impinging upon the microphone 8.

As abovementioned the unit 1 in this instance itself forms the output element of the translating medium, or the element for actuating the record-coacting device; the latter I have shown as the stylus 9, engaging the surface of the record 5, and held for examle in the stylus-holder 10. It is customary to couple such a device with such an element by some form of two-way coupling—i. e., one that provides both a motional response of the device to the element and a motional response of the element to the device; such a coupling means may vary widely in simplicity, from a simple means securing the device to the element, to much more complex coupling means which, however, remain characterized by the two-way action. According to a broad aspect of the present invention, however, I effect a one-way coupling of the record-coacting device (e. g., stylus) to the element (e. g., unit 1)—in other words, I employ a means which couples the device responsively to the element but isolates the element vibrationally from the device, so that vibrational response exists of the device to the element but not of the element to the device. According to a more specific aspect, I produce a cam response of the device to the element by reason of cam coupling means therebetween; and with such coupling I may embody the broader aspect just above mentioned by making the cam means "over-critical," as will hereinafter appear.

I may secure the stylus, through the stylus-holder 10, to a coupling arm or member 11 which is connected to the frame 2 independently of the unit 1, but which has a surface 11a bearing against a portion of the unit; I have shown the member 11 as connected to the frame heel 2a through a leaf spring 12 by which the member is biased to create the mentioned bearing of the surface 11a. The portion of the unit 1 against which this bearing occurs may be its free or short-dimension extremity; more specifically (in order to provide a more suitable bearing surface than the crystal material itself would be) it may be a metal shoe 1b, for example of U-shaped cross-section, secured (as by cementing) around this extremity to form a portion thereof; still more specifically, it may be a restricted surface 1c, for example ball-like, forming a portion of 1b. I arrange the surface 11a obliquely to a line longitudinal of unit 1 (along which line the unit, together with its portion 1c, is of course force-resisting); accordingly transverse vibrations of the unit, moving the surface 1c to the right and left (as illustrated in Figure 1) along the surface 11a, produce an up-and-down movement of the stylus relative to the frame. In view of the inertia of the frame, this up-and-down movement will also take place relative to the record, for the production therein of the desired undulations. Thus the surface 11a forms a cam surface, and the vibrational response of stylus 9 to unit 1 is a cam response. The response is of course unicyclic—that is to say, the stylus vibration is at a frequency or frequencies identical with (and not multiplied relative to) the frequency or frequencies of vibration of the unit.

It is a known physical principle that, in the application of a force through a first surface against a second, and dependent among other things on the materials of the surfaces, there is a critical frictional or camming angle the exceeding of which—is an approach to 90 degrees by the angle between the line of force application and the second surface—will insure the first surface not slipping along the second; in the application of this principle to the structure which I have illustrated and described the first surface will of course be taken as 1c, the second surface as 11a, and the line of force application as a line longitudinal of the unit 1. I desirably make the angle between this longitudinal line and surface 11a at least a shade greater than this critical angle for the particular materials and surfaces employed for 1c and 11a—in other words, I render the cam means over-critical. Accordingly neither the steady upward bias of 11a against 1c (which of course resolves into a steady force along the longitudinal line of unit 1 and a meaningless force longitudinal of 11), nor any unidirectional variations therein (produced for example by accidental excessive pressure on the stylus), nor any oscillatory variations therein (produced for example as a result of the stylus-record engagement), is capable of either displacing or vibrating the unit 1 transversely. Any of the mentioned variations merely vary the longitudinal compression in which the unit 1 finds itself, and as to all reasonable values of which it is quite proof. An utterly obvious advantage is the reduction which I have effected in the fragility of the system.

More significantly, however, it will be appreciated that the coupling means which I have provided, taken together with the element or unit 1, provide quite effective means for keeping the record-coacting device or stylus stationary in the face of vibratory reactions thereon from the record.

It will further be seen that I have rendered the coupling between stylus 9 and unit 1 a one-way coupling, have isolated the unit vibrationally from the stylus, and have suppressed vibrational response of the unit to the stylus. From still another point of view, I have kept the forward (unit-to-stylus) vibrational impedance of the coupling low—i. e., in the general order of range wherein it would conventionally lie (though additionally somewhat lowered by reason of the angular relationships in the system)—while making the inverse (stylus-to-unit) impedance of the coupling substantially infinite. In turn, these various and variously stated functions first eliminate, suppress or minimize the spurious vibration of the record-coacting device (e. g., stylus) otherwise occasioned by non-homogeneities, hardness and surface-level variations, etc. of the record (e. g., 5); and secondly they reduce or eliminate the augmentation of any residual such spurius stylus vibrations which would otherwise be effected by reason of mutual coupling between unit and stylus—rendering the design of the unit exceptionally free of the necessity for compromise in view of phenomena associated with the stylus. Again in turn, these useful functions greatly reduce the recordation of unintended and unwanted noise representations.

The only significant penalty exacted or tending to be exacted for these substantial benefits lies in the somewhat lower amplitude of the intended vibrations of the stylus than of those of the unit 1, by reason of the angular relationships. But, as already pointed out, there is a coincident helpful lowering of the mechanical input impedance, and the lower amplitude under discussion is usually in many other ways also readily compensable.

I intend no limitation to any particular materials for 1b and 11, or surface characteristics for 1c and 11a, although of course the amplitude reduction just above mentioned may obviously be minimized if these parameters are chosen for relatively low critical camming angle and the structure arranged to take advantage thereof. Nor do I intend any limitation as to the configuration of the surfaces. Thus in Figure 2a I show, by way of still non-limitative example of change, a surface 1d for the unit extremity which is of ridge-like, rather than ball-like, formation—tending to give a line, rather than a point, contact with 11a.

Although no limitation whatsoever to such systems is intended, the particularly illustrated system may be taken as one wherein the average or mean depth of cut by the stylus in the record is roughly proportional to the average downward force exerted on the stylus; this is supplied by the mass of the structure acting about the pivots 4a and 4b. Excessive such force has been indicated as oviated by the typical holes 2m and 2n in the main frame portion 2b, and by the extension of the arms 3a and 3b to support a counterweight 13 at any desired distance to the left of the pivots 4a and 4b. It may be mentioned that in the drawing dimensions of most of the components have been considerably exaggerated over those which I would prefer to employ in carrying out my invention in the illustrated form.

In the light of the foregoing description there will be obvious, to those skilled in the art, the application of my invention to other acoustic-mechanical translating systems, such as those operating without the intermediate translation into electric oscillations; to other types of electric-mechanical translating devices, such for example as electromagnetic; to systems for the creation of record grooves undulating otherwise than vertically, for example laterally; to systems for the creation of representations in the record other than of groove form; to translating systems other than for the recording of sound; and the like. These applications of my invention are intended to be embraced in the scope of my invention as expressed in the following group of claims, wherein I undertake to claim the invention as broadly as the state of the art will permit.

I claim:

1. A phonographic recording system comprising oscillation-translating means having an element vibratable in accordance with sound; a device arranged for co-action with a moving record; mechanical means coupling said device to said element for unicyclic vibrational response thereto; and means, comprised in said coupling means, for suppressing the reaction of vibratory power from the record onto said device.

2. A phonographic recording system comprising oscillation-translating means having an element vibratable in accordance with sound; a record-coacting device, and mechanical means coupling said device to said element for unicyclic vibrational response thereto while substantially isolating said element from vibratory power from said device.

3. A phonographic recording system comprising oscillation-translating means having an element vibratable in accordance with sound; a record-coacting device and substantially one-way mechanical power-transferring means coupling said device to said element for unicyclic vibrational response thereto.

4. A phonographic recording system comprising oscillation-translating means having an element vibratable in accordance with sound; a record-coacting device and mechanical means for unicylically transmitting vibrations from said element to said device, said means having a relatively low forward mechanical impedance and a relatively extremely high inverse mechanical impedance.

5. In a phonographic recording system having an element vibratable in accordance with sound;

a record-coacting device and over-critical cam means coupling said device to said element for unicyclic vibrational response thereto.

6. A phonographic recording system including an element vibratable in accordance with sound, and a record-coacting device having at least predominately a unicyclic cam response to vibration of said element.

7. In a phonographic recording system having an element vibratable in accordance with sound; a record-coacting device, and a vibratable member carrying said device and having at least predominately a unicyclic cam response to said element.

8. A phonographic recording system having a piezo-electric bending unit supported at a first extremity and aranged for transverse vibration at its second extremity in accordance with sound, and a vibratable member provided with a surface biased against said second unit extremity and oblique to said unit.

9. A phonographic recording system including an element having a portion which is force-resisting along a longitudinal line but which is transversely vibratable in accordance with sound, and a vibratable member provided with a surface biased against said portion and forming with said line an oblique angle which is a major portion of a right angle.

10. In a phonographic recording system including an element having a portion which is transversely vibratable in accordance with sound; a vibratable member provided with a surface biased against said portion and forming with said line an oblique angle which is a major portion of a right angle, and a record-coacting device connected with said member.

11. A phonographic recording system including an element having a portion which is force-resisting along a longitudinal line but which is transversely vibratable in accordance with sound, and a vibratable member provided with a surface biased against said portion and forming with said line an oblique angle greater than the critical camming angle for said surface and said portion.

12. In a phonographic recording system including an element having a portion which is force-resisting along a longitudinal line but which is transversely vibratable in accordance with sound; a vibratable member provided with a surface biased against said portion and forming with said line an oblique angle greater than the critical camming angle for said surface and said portion, and a record-coacting device connected with said member.

ORVILLE M. DUNNING.

CERTIFICATE OF CORRECTION.

Patent No. 2,208,940. July 23, 1940.

ORVILLE M. DUNNING.

It is hereby certified that error appears in the printed specification of the above numbered patent requiring correction as follows: Page 1, second column, line 28, for the words "effect of" read --effective--; page 2, first column, line 4, for "purley" read --purely--; line 19, for "elements" read --element--; line 73, for "examle" read --example--; page 3, first column, line 48, for "spurius" read --spurious--; and second column, line 13, for "oviated" read --obviated--; lines 27 and 28, for "electric-mechanical" read --electro-mechanical--; page 4, first column, line 17, claim 8, for "aranged" read --arranged--; and second column, line 3, claim 10, before "transversely" insert --force-resisting along a longitudinal line but which is--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.